UNITED STATES PATENT OFFICE.

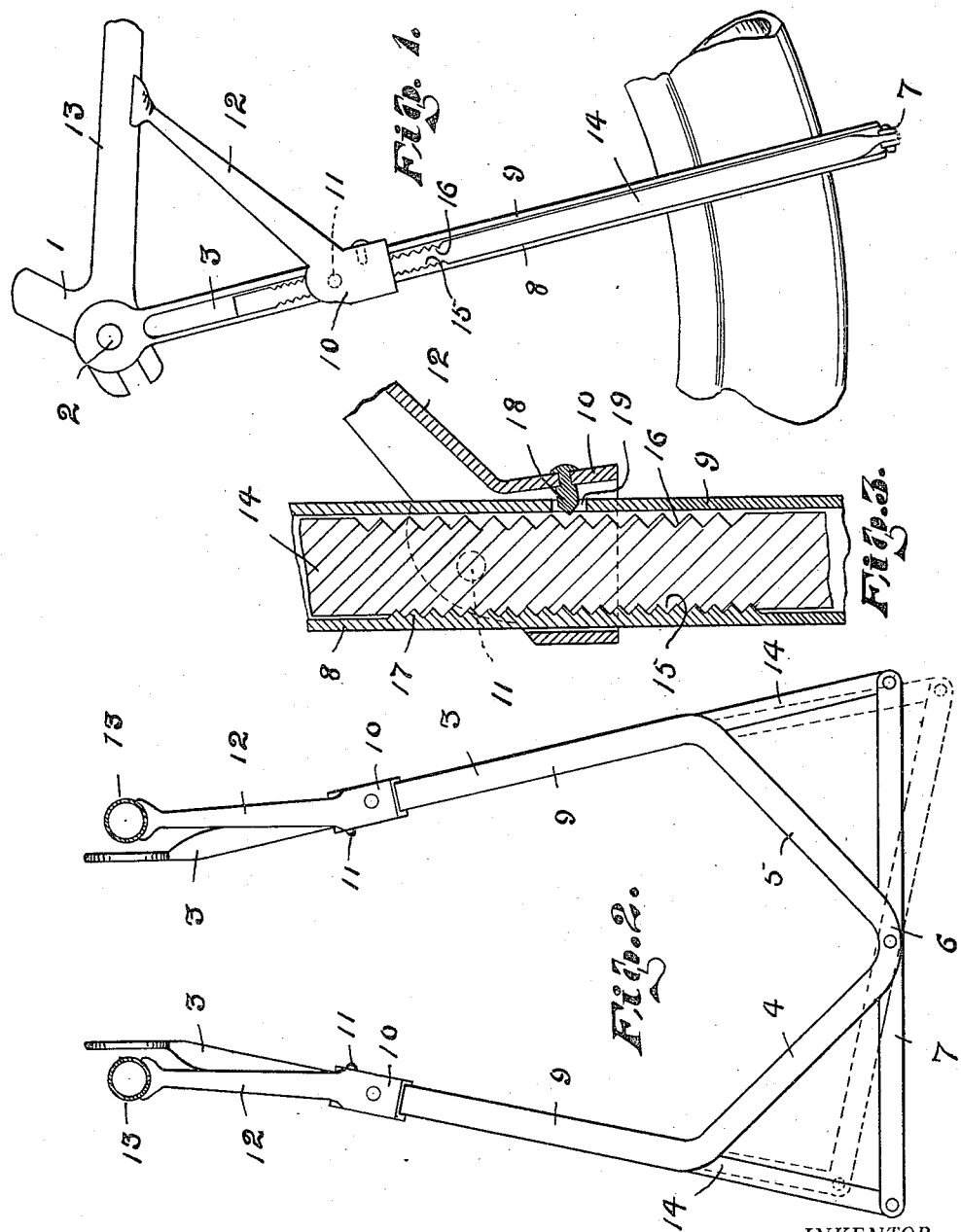

THOMAS JAMES BOWYER, OF DULUTH, MINNESOTA, ASSIGNOR OF ONE-HALF TO CARL O. HANSON, OF DULUTH, MINNESOTA.

MOTOR-CYCLE SUPPORT.

1,175,694.

Specification of Letters Patent. Patented Mar. 14, 1916.

Application filed September 26, 1914. Serial No. 863,650.

*To all whom it may concern:*

Be it known that I, THOMAS J. BOWYER, a citizen of the United States, residing at Duluth, in the county of St. Louis and State of Minnesota, have invented certain new and useful Improvements in Motor-Cycle Supports, of which the following is a specification, reference being had therein to the accompanying drawing.

My invention relates to improvements in motor cycle supports.

The object of my invention is to provide a support for a motor cycle for supporting the rear wheel off of the ground and in which the same will automatically adjust itself to the uneven road conditions to which it may be subjected, at all times maintaining the motor cycle in an upright firm position.

Another object of my invention is to provide a simple, cheap and effective support of this character which can be readily applied to motor cycles and having certain details of structure and operation hereinafter more fully set forth.

In the accompanying drawings: Figure 1 is a side elevation of my improved support as applied to the rear frame of a motor cycle and showing it supporting the wheel off of the ground. Fig. 2 is a front view of my improved support removed from the motor cycle. Fig. 3 is an enlarged vertical sectional view of the holding means of the adjustable rods.

Referring now to the drawings, 1 represents the rear portion of the supporting frame of a motor cycle and to which is pivotally attached at 2 the somewhat U-shaped cycle support 3.

The manner of attaching the support to the frame and that of engagement with the frame when in action is identical with that of supports in common use except that I have changed the shape of the base of the U-shaped support and made it somewhat V-shaped as formed by the inclined portions 4 and 5, terminating in the apex 6 and at which latter point is pivotally attached the tread bar 7, the center of which is arched slightly upward to cause the extreme ends to engage the ground in advance of the middle, this being found in practice to be desirable.

The support iron is composed of a small channel bar, having the flanges 8 and 9 extending outwardly and thus forming a simple and secure support for the pivotal connection of the tread bar 7, besides providing the maximum strength for the given sized bar.

Upon either side of the support and substantially a third of the distance from the pivotal point 2 to the lower extremity of the support is pivotally mounted a housing 10 completely surrounding the channel 3, said housing or sleeve being pivoted at 11 to the web of the housing so that only the lower or body portion of the sleeve is oscillatory.

To the upper edge of the sleeve and integral therewith is formed an inclined arm 12 having a cup-shaped free end for engagement with the rod 13 of the cycle frame when the support is in action and clearly illustrated in the drawings.

Pivotally attached to each extreme end of the tread bar 7 is a rod 14 which extends upwardly between the flanges 8 and 9 of the support frame 3 and these rods extend nearly the entire length of the support frame. For a relatively short distance near their uppermost ends, these rods are notched upon both edges as at 15 and 16 and these notched or serrated portions of the rods occur only at and adjacent the point where the sleeve 10 surrounds the support frame.

As is readily seen, by the tread bar 7 being pivoted at its center 6, when one end raises the other lowers, or vice versa, thus causing the rods 14—14 to reciprocate alternately within the sides of the support frame.

A series of serrations 17 are formed upon the inner wall of the flange 8 of the channel and are designed to interlock with the serrations 15, formed on the edge of the rod 14 when the latter is forced over against the same by the action of the dog 18, which is securely fixed within the wall of the sleeve 10 and which reciprocates within the opening 19 in the flange 9 when so actuated by the oscillation of the sleeve, which derives its motion from the arm 12 engaging the rod 13 of the cycle frame, as before stated. The serration 16, in the opposite edge of the rod 14, is provided for the reception of the angular end of the dog 18 to insure its grip upon the rod. In practice these latter serrations have been found unnecessary but are simply shown to provide a more perfect hold-fast means.

From the foregoing it is readily seen that when the support is brought into action beneath the rear wheel of the cycle and the tread bar touches the ground, it will quickly adjust itself to the inclination of the ground and result in forcing one rod 14 upward, and the other downward, as the case may be. This is readily accomplished and with but little friction on the part of the various serrated faces, as, prior to the engagement of the arm 12 with the rod 13, there is but little frictional contact of the various engaging parts and the arm 12 will automatically adjust itself to the requirements of the contacting serrations. Then, as the weight of the machine settles back upon the support the arms 12—12 are forced downward and the sleeves 10—10 perform their function of holding fast the rods 14—14 in their predetermined position which will maintain the cycle in a firm vertical position and I thus have an automatically adjustable support, little more complicated than the ordinary support.

Having thus fully described my invention what I claim and desire to secure by Letters Patent is:

1. A support of the character described comprising a U-shaped member formed of channel iron and pivoted to the rear of the motor cycle frame, a tread bar pivotally connected to the lower end of the U-shaped member intermediate its ends, rods pivotally connected to the outer ends of the tread bar, and extending within the channels of the U-shaped members and having serrations, sleeves surrounding the U-shaped member and having dogs engaging the serrations of the rods, and operated by the weight of the motor cycle whereby the rods are held in their adjusted position within the U-shaped member.

2. A support of the character described, comprising a U-shaped member formed of channel iron and pivoted to the rear end of a motor cycle frame, a slightly curved tread bar pivoted to the lower end of the member intermediate its ends, rods pivotally connected to the outer ends of the tread bar and extending within the channels of the U-shaped member, sleeves surrounding the U-shaped member and pivoted thereto, arms carried by the sleeve and adapted to engage the motor cycle frame, and dogs carried by the sleeve and adapted to engage the rods for locking them in their adjusted position with respect to the member.

3. A support of the character described, comprising a U-shaped member formed of channel iron and pivoted to the rear end of the motor cycle frame, a tread bar pivotally connected to the lower end of the U-shaped member intermediate its ends, rods pivotally connected to the outer end of the tread bar, and having serrated upper ends extending within the channels of the U-shaped member and coöperating with serrations in the said member, sleeves pivotally secured to the U-shaped member and having arms engaging the frame of the motor cycle, and dogs carried by the sleeves and passing into the channel of the U-shaped member and engaging the serrations of the rods, whereby they are held in their adjusted position with respect to the said member.

4. In an adjustable cycle support, a U-shaped member pivoted to the rear of a cycle frame, a tread bar pivotally attached to the lowermost extremity of the U-shaped member, and means operated by the weight of the motor cycle for maintaining the bar in any adjusted position.

5. A support of the character described, comprising a member pivoted to the rear end of the motor cycle frame, a tread bar pivotally attached to the lower end of said member, and means operated by the weight of the motor cycle for adjustably holding the tread bar with respect to said member.

6. A support of the character described, comprising a member pivoted to the rear of a motor cycle frame, a tread bar pivotally attached to the lower end of said member, rods pivotally attached to the tread bar, and means operated by the weight of the motor cycle for adjustably securing the rods to the member in their adjusted position.

7. A support of the character described, comprising a member pivoted to the rear of a motor cycle frame, a tread bar pivotally attached to the lower end of the said member intermediate its ends, rods pivotally connected to the ends of said tread bar, and means carried by the said member for holding the said rods in their adjusted position, said means operated by the weight of the motor cycle.

8. A support of the character described, comprising a U-shaped member pivoted to the rear of a motor cycle frame, a tread bar pivotally connected to the U-shaped member intermediate its ends, rods pivotally connected to the outer ends of the said tread bars and telescoping within the U-shaped members, and automatic means for holding the said rods in their adjusted position within the U-shaped member, the said automatic means operated by the weight of the motor cycle.

9. A support of the character described, comprising a U-shaped member pivoted to the rear end of a motor cycle frame, a tread bar pivotally connected to the U-shaped member midway its ends, rods pivotally connected to the outer ends of the tread bar and telescoping within the U-shaped member and having serrated upper ends, and means operated by the weight of the motor cycle and carried by the U-shaped member for engaging the serrations of the rods and locking them within the U-shaped member in their adjusted position with respect thereto.

In testimony whereof I hereunto affix my signature in the presence of two witnesses.

THOMAS JAMES BOWYER.

Witnesses:
 ED. GUSTAFSON,
 W. I. HINES.

Copies of this patent may be obtained for five cents each, by addressing the "Commissioner of Patents, Washington, D. C."